US009799081B1

(12) United States Patent
Lewis et al.

(10) Patent No.: US 9,799,081 B1
(45) Date of Patent: Oct. 24, 2017

(54) CONTENT RECOMMENDATION PLATFORM

(71) Applicant: Google Inc., Mountain View, CA (US)

(72) Inventors: Justin Lewis, Marina del Rey, CA (US); Jeffrey Lee-Chan, Venice, CA (US)

(73) Assignee: Google Inc., Mountain View, CA (US)

(*) Notice: Subject to any disclaimer, the term of this patent is extended or adjusted under 35 U.S.C. 154(b) by 468 days.

(21) Appl. No.: 14/231,179

(22) Filed: Mar. 31, 2014

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC ...................................................... G06Q 50/01
USPC .......................................................... 709/217
See application file for complete search history.

(56) References Cited

U.S. PATENT DOCUMENTS 8,909,667 B2 * 12/2014 Svendsen .......... G06F 17/30029 370/386
9,195,753 B1 * 11/2015 King ................. G06F 17/30867
2009/0163183 A1 * 6/2009 O'Donoghue ......... G06Q 30/02 455/414.1
2011/0161409 A1 * 6/2011 Nair .......................... G06F 8/38 709/203
2012/0102121 A1 * 4/2012 Wu ................... G06F 17/30705 709/206
2013/0204825 A1 * 8/2013 Su ............................ G06N 5/04 706/46
2013/0346877 A1 * 12/2013 Borovoy ............... H04L 65/403 715/753
2014/0229416 A1 * 8/2014 Bae .......................... G06N 5/02 706/46
2014/0258309 A1 * 9/2014 Young ................. G06F 17/3053 707/748
2015/0262069 A1 * 9/2015 Gabriel ............. G06F 17/30867 706/48

* cited by examiner

*Primary Examiner* — Phuoc Nguyen
(74) *Attorney, Agent, or Firm* — Lowenstein Sandler LLP

(57) ABSTRACT

A method for recommending content is disclosed. The method includes identifying social relationship data for a user, the social relationship data including a set of associated users, determining a subset of the set of associated users based on similarity of content item interaction on a content sharing server, and providing the subset of associated users as recommended users to follow by the user. The method also includes receiving an indication of a selection of users from the subset of associated users, originating a social content item recommendation list for the user based on the selected users, and providing the social content item recommendation list to the user.

27 Claims, 7 Drawing Sheets

CONTENT RECOMMENDATION PLATFORM

TECHNICAL FIELD

This disclosure relates to the field of content sharing networks and, in particular, to content recommendation based on user history.

BACKGROUND

On the Internet, social networks allow users to connect to and share information with each other. Many social networks include a content sharing aspect that allow users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

A social network with content sharing capabilities, such as a content sharing platform, may provide centralized locations for a content owner to showcase their content. These centralized locations are sometimes known as a channel. The channel may be presented by the content sharing platform via one or more channel pages. The channel may be used by a content owner to convince new viewers to subscribe or follow to content of the content owner. Furthermore, a channel may be used by a content owner as a central location for subscribed users to comment on content, find the latest updates, and discover new content from the channel owner.

Furthermore, on the Internet, social networking services or other applications can allow a user to be associated with other users, where these associations can be described in a social graph. Some of these associated users may also be interested in similar types of content, and these associated users may assert an influence over each other's content selections.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for recommending content on a content sharing platform is disclosed. The method includes identifying social relationship data for a user including a set of associated users, determining a subset of the set of associated users based on similarity of content item interaction on a content sharing platform, and providing the subset of associated users as recommended users to follow by the user. The method also includes receiving an indication of a selection of users from the subset of associated users, originating a social content item recommendation list for the user based on the selected users, and providing the social content item recommendation list to the user.

In some implementations, the subset of associated users can be determined based on at least one of current subscriptions of the user or an activity history of the user on the content sharing platform. Determining the subset of associated users can include determining content items on the content sharing platform with an interaction by the user, for each content item viewed by the user, determining other users of the set of associated users that had an interaction with the content item to determine an affinity score for each user, and selecting users for the subset of users with an affinity score that exceeds a threshold.

In some implementations, the user can also be a member of an online social network separate from the content sharing platform, and the social relationship data can be determined based on connections of the user on the social network to other users of the social network or from an address book of the user.

In some implementations, the method can include generating a subscription to the selected users on the content sharing platform.

In one implementations, a method includes identifying social relationship data for a user including a set of associated users, determining a subset of the set of associated users based on similarity of content item interaction on a content sharing platform, using content items associated with the subset of associated users to originate a social content item recommendation list for the user, and providing the social content item recommendation list to the user.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Figure 1:
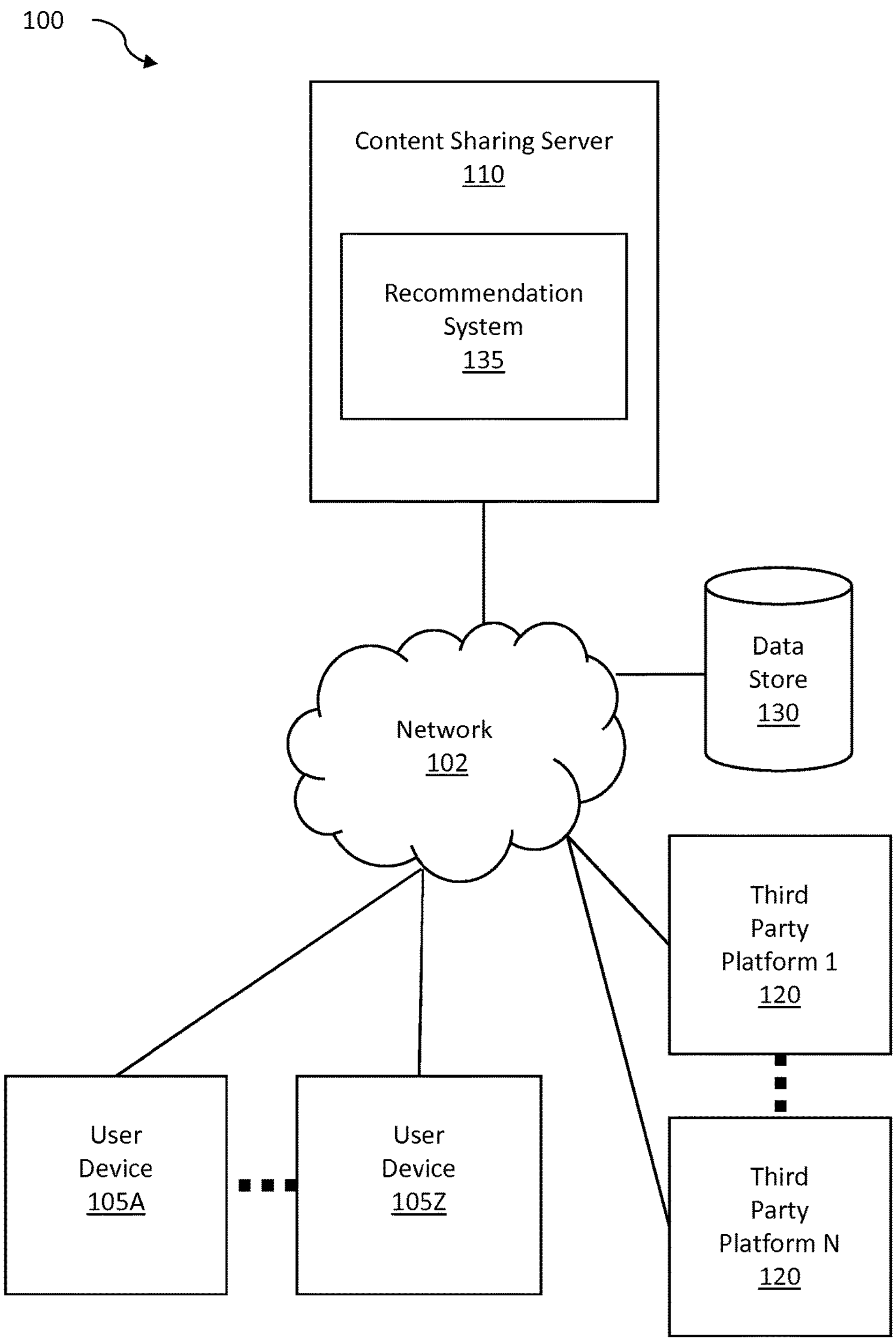
FIG. 1 is a block diagram illustrating an exemplary network architecture in which implementations of the disclosure may be used.

Implementations are described for recommending content on a content sharing server. In one implementation, a content sharing server can provide content recommendations to a user based on content interaction histories of other users associated with the user. These associated users can be associated with the user on the content sharing server, a third party platform (e.g., an online social network), or in an address book or contact history. The content recommendations can further be based on a subset of associated users that have a similar content interaction history to the user. As a result, the user is provided with useful content recommendations, where the user is likely to interact with (e.g., view, listen to, comment on, like, share, recommend, etc.) the recommended content.

For example, a user may need a way to receive high quality content recommendations (e.g., for audio content, video content, channels, online social network pages, websites, etc.). Related content, where the content is similar to content previously consumed or interacted with by the user (e.g., being of a similar subject matter, genre, content producer or creator, etc.) can be considered when content recommendations are provided to a user. Social annotations (e.g., an indication that another user or an associated user interacted with the content) can impact whether a user decides to interact with a content item. By considering both related content and social annotations, a user can be provided with high quality (or highly relevant) recommendation for content items that are likely to generate a user interaction. Because the user is more likely to interact with the content, more revenue can be generated for the content sharing service and/or a content provider, e.g., through advertising fees.

In an example for determining related content, content items that are related (e.g., same or similar content creator, similar genre, similar theme, etc.) to the content item that the user is currently or has previously interacted with can be indicated to the user as related content items. In another example, interaction histories for users that have interacted with a certain content item can be analyzed to find other content items with which the users have interacted. These other content items can be recommended to a user that has interacted with the certain content item, but has not yet interacted with the other content items.

In another example for determining recommended content, a user's content interaction history can be used to determine content that is related (e.g., same or similar content creator, similar genre, similar theme, etc.) to the content that the user has previously interacted with, but has not yet been interacted with by the user.

In an implementation of a method described herein, content items can be recommended to a user based on a subset of users that have interacted with the content items that are a part of the user's social graph. In other words, content items can be recommended based content items that were interacted with by users that are associated with the user in an online social network. Because the user is associated with the associated users, it is more likely that the user and the associated users have similar preferences for content.

In an implementation, a subset of the associated users can be used to determine content to recommend to the user, where the subset of associated users can be selected based on interactions with similar content to the user. In an implementation, a subset of users can be automatically selected. In another implementation, the subset of associated users can be provided as recommended users to the user, and the user can select users from amongst the subset of associated users on which content recommendations can be based.

For example, the associated users can include users that the user follows or subscribes to on the content sharing service, users that the user follows or subscribes to on an online social network, users that the user selects as associated users, users that follow or subscribe to the user on an online social network, users in an address book of the user, users that the user has texted, emailed, or called, and/or any other suitable method of association. In one example, edges of a user's social graph can be marked based on the similarity of content interaction between the user and an associated user, e.g., to indicate that that the users have similar content preferences. The edges could be marked by adding an extra element to an existing edge stored in a data store or by generating a new list of edges.

In one example, a list of the interactions (e.g., likes, comments, views, curations, shares, etc.) with content items for the user and the associated users can be determined. A score (e.g., an affinity score) can then be generated for each of the associated users based on the number of interactions that the user has in common with the associated users. This score can then be compared to a threshold to identify whether the user and each of the associated users has similar preferences or tastes in content. Once the associated users with similar preferences have been identified (and, e.g., the edges of the social graph are marked accordingly) content items that the user has not interacted with, but these associated users have interacted with, can be recommended to the user. In an example, scores might be normalized by dividing them by a user's total interactions, a total count of content items with which the user interacts, and/or a number of different genres of content with which the user interacts.

In an implementation, associated users with similar preferences can be additionally determined via attribution tags. An attribution tag may be a unique identifier that is generated based on information about the user and the content. For example, an attribution tag may be a unique combination of at least a referring user identifier and a content identifier. An attribution tag also may include other information such as a timestamp, a sharing source, and/or a target destination for a referral. The attribution tag may be obfuscated by performing one or more of bitwise operations, hashing, and/or encryption to preserve integrity and prevent unauthorized use. Attribution tags can be associated with a content item that an associated user shares with the user. If the user interacts with the shared content item, this interaction can be recorded in a database via the attribution tag. These interactions recorded in the database can be used to determine that the user is interested in the content that the associated user shares, so it is likely that they have similar content preferences. This associated user can then be recommended to the user to follow, and/or content interacted with by the associated user can be recommended to the user.

In an implementation, an engagement wizard is provided to the user to select associated users to follow or subscribe to, such that, once the user follows or is subscribed to, the user will receive content item recommendations based on those users. For example, the engagement wizard can determine the user's social relationship data to determine a set of associated users. The engagement wizard can then analyze the content interaction history of the user and each of the associated users to determine a subset of associated users that have a similar content interaction history to that of the user. The engagement wizard can then provide this subset of associated users to the user as recommended users for the user to follow. The user can then select users from the subset of associated users for the user to follow, e.g., based on the user's knowledge of the preferences of each of the subset of associated users. Recommended content items can then be provided to the user based on the content interaction histories of each of the selected users. In an implementation, the user can modify the selection based upon changing preferences or upon determining that a previous selection was undesired.

In implementations, the content item recommendations can be provided by any suitable method, e.g., on a user interface of the content sharing server, via email, via text, as feed items, via an online social network, on a user's personal page of the content sharing server, etc.

FIG. 1 is a block diagram illustrating an exemplary network architecture 100 in which implementations of the disclosure may be used. The network architecture 100 includes user devices 105A-Z, third party platforms 1-N 120, and a data store 130 communicably coupled to a content sharing server 110 via a network 102. In some implementations, content sharing server 110 is also known as a content sharing platform. The network 102 includes the Internet in one implementation. In other implementations, other networks, wired and wireless, such as an intranet, local area network (LAN), wide area network (WAN), or broadcast network may be used as or be part of network 102.

Content sharing server 110 can be a social network that allows users to connect to and share information and content items with each other. Many social networks include a content sharing aspect that allow users to upload, view, tag, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, audio clips, and music videos, as well as content from amateur content creators, e.g., video blogging and short original videos. In some implementations, the shared content is stored in data store 130.

Content sharing server 110 is capable of operating within a single server device or on multiple server devices. Examples of devices may include, but are not limited to, servers, mainframe computers, networked computers, process-based devices, and similar type of systems and devices.

In one embodiment, the third party platforms 120 provide an Internet-based method of sharing content. For example, the third party platforms 120 can be a social network, an image sharing platform, a video sharing platform, etc. A user can share content with desired users via the third party platforms 120. For example, the third party platform 120 may be one or more computing devices (e.g., servers), data stores, networks, software components, and/or hardware components that may be used to allow users follow, "friend", associate with, to connect to, share information, and/or interact with each other. The third party platform 120 can be, for example, a social network (SN) that may present to a user a listing (e.g., activity feed, feed, stream, wall, etc.) of objects (such as posts, content items (e.g., video, images, audio, etc.), status updates, favorability indications, tags, messages, and so on) generated by other users of the social network. The third party platform 120 may also include a content sharing aspect that allows users to upload, view, tag, and share content, such as text content, video content, image content, audio content, and so on. Other users of the third party platform 120 may comment on the shared content, discover new content, locate updates, share content, and otherwise interact with the provided content.

In one implementation, the third party platform 120 can be a mobile platform to allow users to connect to, share information, and/or interact with each other using one or more mobile devices, smart phones, tablet devices, and other mobile communication devices that allow users to communicate over a telecommunications network. For example, the mobile platform may enable telephony communication, Short Message Service (SMS) messaging, Multimedia Message Service (MMS) messaging, text chat, and video chat between users.

Data store 130 can include one or more writable persistent storage devices, such as memories, tapes or disks. The data store 130 may include, but is not limited to, a table, a database, a directory, a repository, and one or more files, to name a few examples.

Although each of content server 110, third party platforms 120, and data store 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

One or more user devices 105A-Z may be in communication with the content sharing server 110 and the third party platforms 1-N 120 over the network 102. The user devices 105A-Z may be any type of computing device, for example, a device including a processor, a computer-readable medium, and a memory. The user devices 105A-Z may be, for example, a personal computer, a laptop computer, a tablet computer, a personal digital assistant (PDA), a cellular telephone, other mobile devices, etc. In some implementations, the user devices 105A-Z may be executing a browser application or other application adapted to communicate over Internet related protocols (e.g., TCP/IP and HTTP) and/or display a user interface. Network architecture 100 may support a large number of concurrent sessions with many user devices 105A-Z.

During operation of network architecture 100, a user may access content sharing server 110 via a user device 105A-Z over network 102. The content sharing server 110 receives communications from the user device 105A-Z, and processes and/or directs these communications accordingly. In one implementation, the content sharing server 110 comprises a processing device and a computer-readable memory.

In one implementation, the user devices 105A-Z may run an operating system (not shown) that manages hardware and software of the user device 105A-Z. A browser (not shown) may execute on the user devices 105A-Z (e.g., on the OS of the client machines). The browser may be a web browser that can access content served by a content sharing server 110 by navigating to web pages provided by the content sharing server 110 (e.g., using the hypertext transport protocol (HTTP)). The browser may issue queries and commands to the content sharing server 110, such as commands to access a specific content item, commands to share a content item, commands to optimize the content item, and so forth.

In some implementations, user devices 105A-Z include applications that are associated with a service provided by content sharing server 110. Examples of a client device that may use such applications ("apps") include mobile phones, "smart" televisions, tablet computers, and so forth. The applications or apps may access content provided by content sharing server 110, issue commands to content sharing server 110, receive content from content sharing server 110, and so on without visiting web pages of content sharing server 110.

Via an app or a browser, the user devices 105A-Z may access content items provided by content sharing server 110. In one implementation, the content items are provided as a channel or other content source that clients may subscribe to. Users may select content items for viewing via the app or browser. The app or browser of the user device 105A-Z may then receive content items that are maintained by content sharing server 110. Additionally, the user devices 105A-Z may also upload content items to the content sharing server 110 for storage in a repository, such as data store 130 via the app or browser.

In general, functions described in one implementation as being performed by the content sharing server 110 can also be performed on the user devices 105A-Z in other implementations if appropriate. In addition, the functionality attributed to a particular component can be performed by different or multiple components operating together. The content sharing server 110 can also be accessed as a service provided to other systems or devices through appropriate application programming interfaces, and thus is not limited to use in websites.

In one implementation, content sharing server 110 provides a centralized location for a user to showcase objects related to the user, such as information and content pertaining to the user. In one implementation, an object includes a post, a content item (e.g., audio, video, image), a comment, a message, an email message, a status update, a favorability indication (e.g., a like), a subscription event, a tagging event, a viewing event (e.g., click), and so on. The centralized location is sometimes known as a user page or a channel. In addition, the representation of the user on the content sharing server 110 may sometimes be referred to as an "entity".

As discussed above, a channel can be data content available from a common source or data content having a common topic or theme. The data content can be media content chosen by a user, media content made available by a user, media content uploaded by a user, media content chosen by a content provider, media content chosen by a broadcaster, etc. In some implementations, a channel is created and owned by a user of the content sharing server 110, and may be referred to as a user channel. In other implementations, a channel may be generated and owned by the content sharing server 110 to be used as a central location for all content related to a certain topic, and may be referred to as a topic channel.

In implementations of the disclosure, recommendation system 135 identifies and provides content recommendations to a user of the content sharing server 110 for use in generating a recommendation list for the user. A content recommendation list can be defined as a collection of one or more content items (e.g., video, audio, a channel, an online social network page, a website, a feed, etc.) of the content sharing server that can be viewed in sequential or shuffled order without interaction from the user.

When a user accesses the content sharing server 110, the user is directed to a home page of the user or another user interface (UI) (e.g, a graphical UI) representing a home page of the user. The home page may include a recommendation UI generated by recommendation system 135. In one implementation, this recommendation UI includes one or more content items of the content sharing server 110 that are identified by recommendation system 135 based on current subscriptions of the user and/or an activity history of the user. Subscriptions may include a connection between the user and another user (e.g., an individual person, an organization, a business, a government, or any other entity) on the content sharing server. In some implementations, a subscription includes friending a user, liking a user, following a user, and so on. Although the description herein references the term subscription, other terms denoting a connection between a user and an entity of the content sharing server or platform are also encompassed.

An activity history, which may be maintained in the data store 130, may be accessed to identify content interests of the user. The activity history may include a history of content items previously viewed or interacted with by the user, content items liked by the user, lists manually generated by the user, connections from other social networks external to the content sharing server 110 indicating interests of the user, and so on.

The recommendation system 135 can identify social relationship data (e.g., a social graph) for the user. For example, the recommendation system 135 can identify social relationship data based on users associated with the user on third party platforms 1-N 120, based on users associated with the user on the content sharing server 110, users listed in an address book, users that the user has emailed, texted, or called, or by any other suitable method. The recommendation system 135 can then determine activity histories for each of the associated users. Based on the activity history of the user and the activity histories of each of the associated users, the recommendation system 135 may determine a subset of associated users with content preferences similar to the users. In an implementation, the recommendation system 135 can provide a content recommendation list to the user based on content items interacted with by the subset of associated users.

In another implementation, the recommendation system 135 can provide the subset of associated users to the user as recommended users for the user to follow. The user can then select from the subset of associated users those associated users that the user would like to follow. The recommendation system 135 can then provide a list of recommended content to the user based upon the associated users that the user selected.

In an embodiment, a UI for a display on the home page of the user (or other webpage or website accessible by the user) may be generated to present these subset of associated users to the user for the user's selection purposes. In one implementation, a UI includes a document, a portion of document, or a set of documents rendered in HyperText Markup Language (HTML).

When the user selects users of the subset of associated users via the UI, the recommendation system 135 can then display the recommended content list to the user via the UI, or via another UI.

In an implementation, the recommendation system 135 can create subscriptions for the user to users in the subset of associated users and/or the selected users from the subset of associated users. This subscription can then be displayed to the user on the home page of the user as one of the user's current subscriptions. The subscription information may also be stored in the user data store 130.

In some implementations, the content recommendation list (e.g., an object comprising the source content item identifier(s), user identifier, number of videos, etc.) may be associated with an identifier and stored in a data store of the content sharing server 110. As a result, the content recommendation list may be persisted on the homepage of the user for any subsequent visits by the user.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 2:
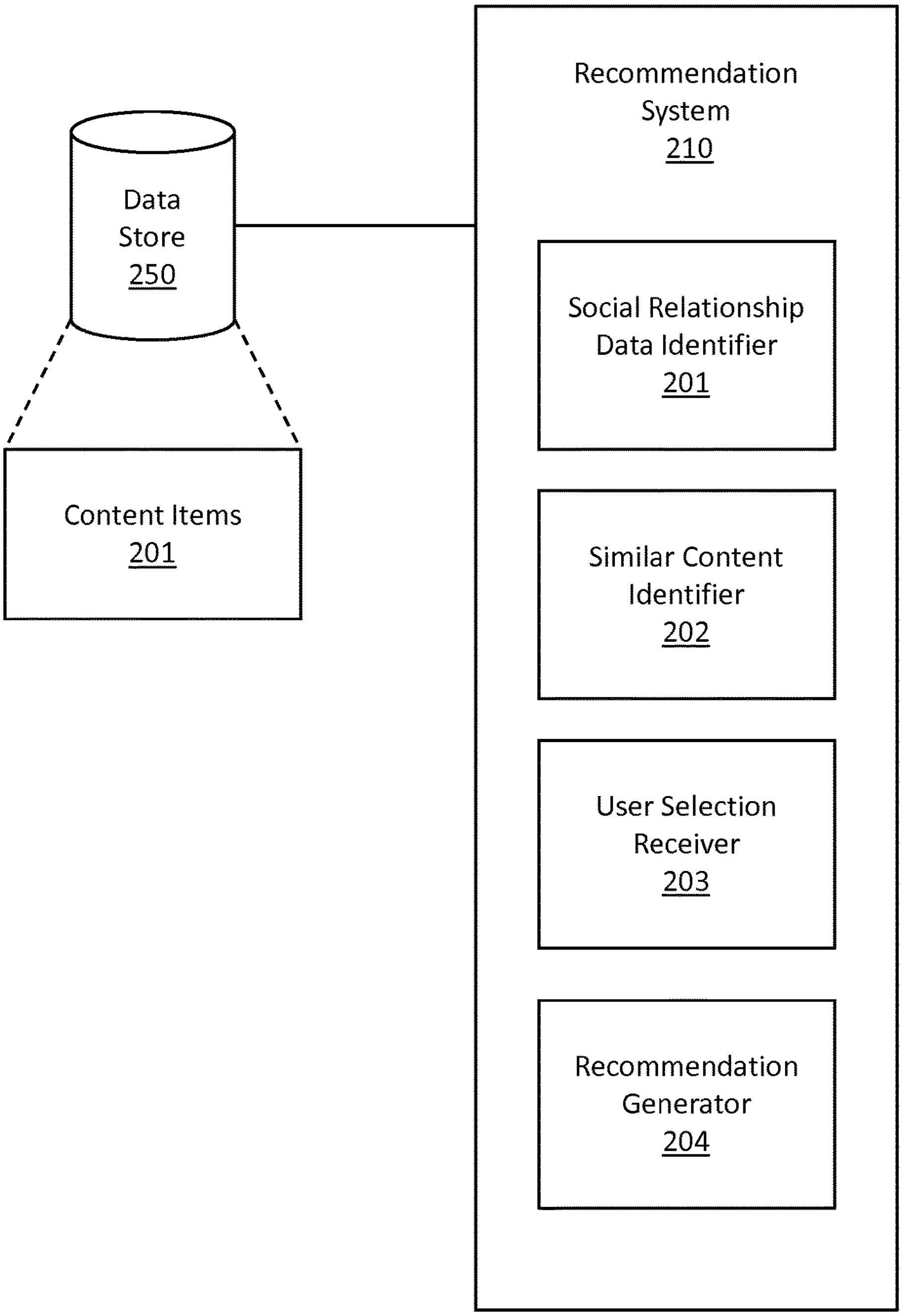
FIG. 2 illustrates a recommendation system, in accordance with one embodiment of the present disclosure.

FIG. 2 illustrates a recommendation system 210, in accordance with one embodiment of the present disclosure. The recommendation system 210 may include a social relationship identifier 201, a similar content identifier 202, a user selection receiver 203, and a recommendation generator 204. More or less components may be included in the recommendation system 210 without loss of generality. In an embodiment, recommendation system 210 is recommendation system 135 and data store 250 is data store 130 shown in FIG. 1.

In an implementation, the social relationship data identifier 201 identifies social relationship data of a user to determine other users that are associated with the user. For example, the social relationship data can be a social graph, where, e.g., the nodes of the graph are users and the edges of the graph show connections between the users. The social relationship data can be retrieved from or sent by a third party platform, such as an online social network. The social relationship data can be based on associated users on a content sharing service. The social relationship data can be based on an address book (e.g., on a mobile device, in an email contacts lists, in an online address book, in a locally stored address book, etc.), or users that have previously been called, texted, emailed, or messaged by the user.

Once the social relationship data has been identified, a similar content identifier 202 can compare a content interaction history of the user with content interaction histories of the associated users to determine a subset of associated users that have similar preferences for content interaction. In an implementation, the subset of associated users can be determined according to an algorithm that calculates an affinity score for each of the associated users. A threshold may be established to determine associated users with similar preferences by including users with an affinity score above the threshold in the subset of associated users.

For example, the affinity score can be an indication of a level of connection between two users of the content sharing service. The affinity score may be calculated by looking at content interactions that a user takes in association with a content item (e.g., clicking, liking (providing a positive feedback), commenting, tagging (e.g., assigning an identifier to a piece of information), sharing, subscribing (e.g., to a channel of a content owner)). In addition, other factors such as mode of interaction of the user with respect to the content, frequency of interaction of the user with respect to the content, time since last interaction of the user with respect to the content, and so on, may be taken into consideration for determining the affinity score. The affinity score can also have a time component, such as a time decay that decreases the affinity score over time. That is, the affinity score of a user can decrease if the user stops interacting with content. Alternatively, the affinity score of the user can increase as the user again interacts with content. An affinity score may be a one-way score (e.g., not reciprocal). In other words, a first user's affinity score for a second user is not necessarily the same as the second user's affinity score for the first user.

In an implementation, an affinity score may further be determined via attribution tags. Attribution tags can be used to associate another user with content that the other user wishes to share with others. The attribution tag may be included in a link distributed to one or more systems external to the content source. The external systems may use the link to provide a user with access to the content. A request including the attribution tag may be received from the user when the user seeks to access the content. The attribution tag may be analyzed to determine that the content was referred. A record of the referral may be stored. The record of this referral can be used to determine that the user was interested in content associated with the other user, which could indicate that these users may have similar preferences in content interaction. As a result, the affinity score between these users may be higher.

In an implementation, the user selection receiver 203 can provide the subset of associated users to the user as recommendations (e.g., to follow or subscribe to) for the user. The user selection receiver 203 can then receive a selection of the subset of associated users from the user. For example, since the user may be familiar with the subset of associated users, the user may know which users of the subset of associated users have similar content interaction preferences to the user. In an implementation, the subset of associated user can be presented to the user for selection via a UI.

In an implementation, the recommendation generator 204 can then generate a content item recommendation list for the user based on the subset of associated users and/or the selected users from the subset of associated users. For example, the recommendation generator 204 can select content items 201 for the content item recommendation list with which users of the subset of associated user and/or the selected users from the subset of associated users have interacted. In an example, the content items selected may be content items with which the user has not previously interacted. In an implementation, the recommended content item list can be presented to the user via a UI.

Figure 3A:
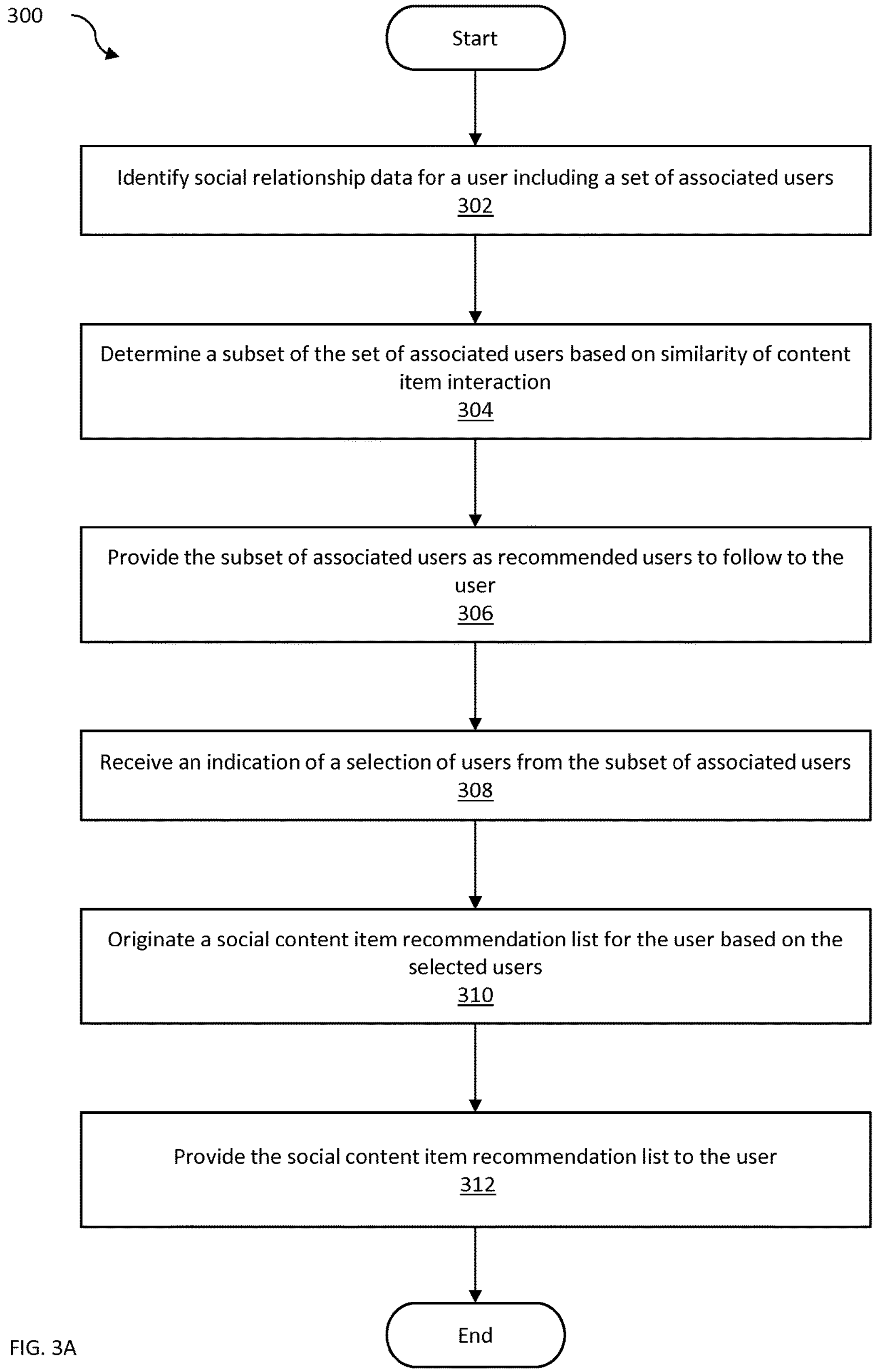
FIG. 3A is a flow diagram illustrating a method for recommending content, according to an implementation of the disclosure.

FIG. 3A is a flow diagram illustrating a method 300 for generating content item recommendations, according to an implementation of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one implementation, method 300 may be performed by recommendation system 135 of a content sharing server 110, as shown in FIG. 1.

At block 302, processing logic identifies social relationship data for a user including a set of associated users. For example, a social graph can be determined for User A based on "friends" of User A on Social Network F, where User A's "friends" are considered part of a set of associated users. The social graph can further include users that User A follows on Content Sharing Service Y, where these users are also considered part of the set of associated users. In this example, the set of associated users includes about 200 users.

At block 304, processing logic determines a subset of the set of associated users based on similarity of content item interactions. In an implementation, the subset is determined by determining an affinity score for each of the associated users and selecting associated users with an affinity score above a certain threshold for the subset. Further to the example above, User A prefers to watch sports videos on Content Sharing Service Y, so User A's content item interactions (i.e., a content interaction history) includes mostly views of sports videos. As a result, when a subset of the set of associated users, Subset S (e.g., 20 users), is determined for User A, the users included in Subset S typically have content item interactions (i.e., a content interaction history) that are predominately viewing of sports videos.

At block 306, processing logic provides the subset of associated users as recommended users to follow to the user. Further to the example above, User A is provided with a list of the users in Subset S, e.g., via a UI, and User A can be prompted to select users from Subset S that User A is interested in following, subscribing to, or interacting with the content items interacted with by that user.

At block 308, processing logic receives an indication of a selection of user from the subset of associated users. Further to the example above, User A selects users, Selected Users T, from Subset S that User A knows to be enthusiasts for the same sports team (e.g., Team Z) that User A likes.

At block 310, processing logic originates a social content item recommendation list for the user based on the selected users. Further to the example above, User A can be provided with a content item recommendation list via a UI that includes content items that User A has not interacted with, but which have been interacted with by users of Selected Users T. For example, the content item recommendation list can include video clips of players for Team Z that one or more of Selected Users T have viewed, but User A has not viewed.

Figure 3B:
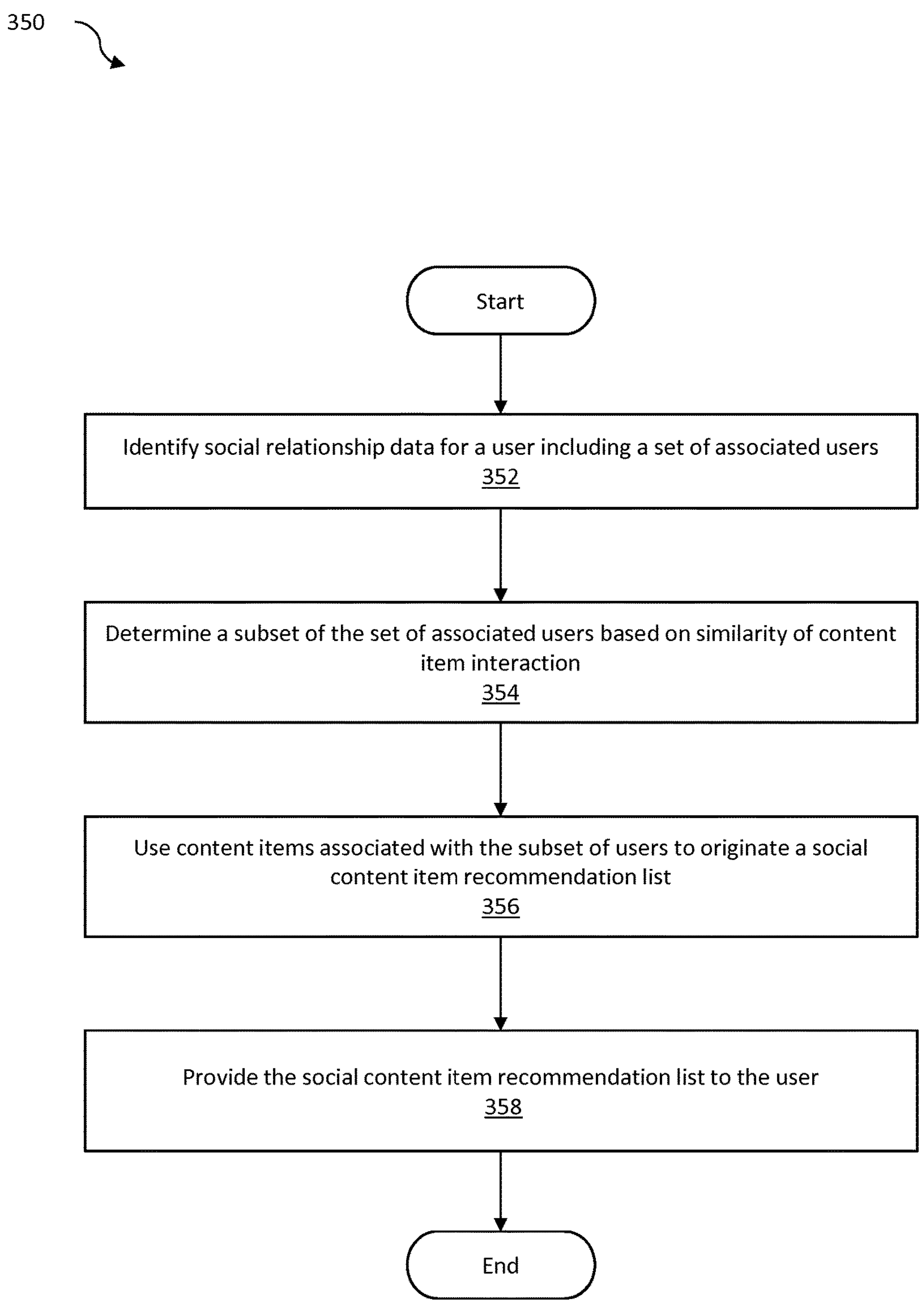
FIG. 3B is a flow diagram illustrating another method for recommending content, according to an implementation of the disclosure.

FIG. 3B is a flow diagram illustrating a method 350 for generating content item recommendations, according to an implementation of the disclosure. The method 350 may be performed by processing logic that comprises hardware (e.g., circuitry, dedicated logic, programmable logic, microcode, etc.), software (e.g., instructions run on a processing device to perform hardware simulation), or a combination thereof. In one implementation, method 350 may be performed by recommendation system 135 of a content sharing server 110, as shown in FIG. 1.

At block 352, processing logic identifies social relationship data for a user including a set of associated users. For example, a social graph can be determined for User B based on "friends" of User B on Social Network F, where User B's "friends" are considered part of a set of associated users. The social graph can further include users that User B follows on Content Sharing Service Y, where these users are also considered part of the set of associated users. The social graph can also include contacts in the address book on User B's mobile phone. Further, the social graph can include users that have shared content that User B has interacted with, where User B's interaction with the content shared by these users is determined via attribution tags. In this example, the set of associated users includes about 1000 users.

At block 354, processing logic determines a subset of the set of associated users based on similarity of content item interactions. In an embodiment, the set of associated users can be determined by an affinity score, where users selected for the subset have an affinity score above a certain threshold. Further to the example above, User B prefers to listen to classical music on Content Sharing Service Y, so User B's content item interactions (i.e., a content interaction history) include mostly play of classical music audio. As a result, when a subset of the set of associated users, Subset C (e.g., 10 users), is determined for User B, the users included in Subset C typically have content item interactions (i.e., a content interaction history) that are predominately playing classical music audio.

At block 356, processing logic uses content items associated with the subset of users to originate a social content item recommendation list. Further to the example above, User B can be provided with a content item recommendation list via a UI that includes content items that User B has not interacted with, but which have been interacted with by users of Subset C. For example, the content item recommendation list can include audio of classical music that one or more users of Subset C have played, but User B has not played.

Figure 3C:
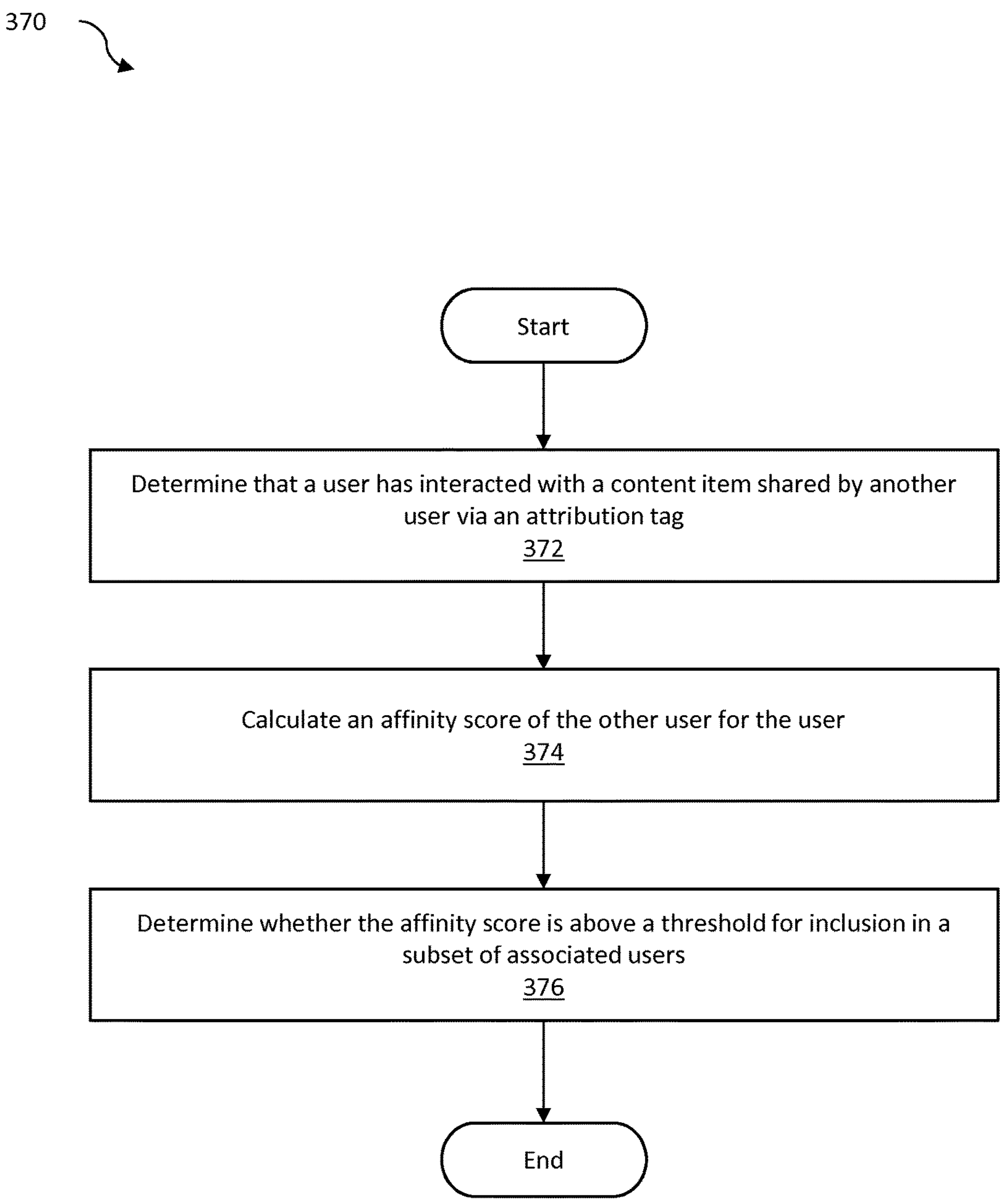
FIG. 3C is a flow diagram illustrating a method for determining a set of associated users, according to an implementation of the disclosure.

FIG. 3C is a flow diagram illustrating a method 370 for determining a set of associated users, according to an implementation of the disclosure. The method 370 may be performed by processing logic that comprises hardware (e.g., circuitry, dedicated logic, programmable logic, microcode, etc.), software (e.g., instructions run on a processing device to perform hardware simulation), or a combination thereof. In one implementation, method 370 may be performed by recommendation system 135 of a content sharing server 110, as shown in FIG. 1.

At block 372, processing logic determines that a user has interacted with a content item shared by another user via an attribution tag associated with the content item. In an implementation, user interactions with the shared content item are recorded in a database, where the attribution tag provides the information needed to associate the content item with the sharing user and the user interacting with the shared content. For example, User P wants to share Video V with User B. An attribution tag is attached to Video V when User P shares Video V with User B. When User B views Video V, User B's viewing of Video V that User P shared is recorded in a database because of the attribution tag attached to Video V. As a result, it can be determined that User B has been interested in content shared by User P.

At block 374, processing logic calculates an affinity score of the other user for the user based, at least in part, on the determination that the user has interacted with the content item shared by the other user as determined by the attribution tag. Further to the example above, an affinity score of User P can be calculated for User B, where the affinity score is relatively higher because of the record of User B viewing Video V shared by User P stored in the database.

At block 376, processing logic determines whether the affinity score for the other user is above a threshold such that the other user should be included in a subset of associated users. Further to the example above, the affinity score of User P, along with the other users associated with User B, can be normalized, such that the relative affinity for User P with respect to the other associated users can be determined. A threshold can be set based on any suitable parameter, including, but not limited to, a certain percentage of the associate users, a relative number of similar interactions, by dividing the scores by each users number of interactions, a count of the content items each user interacts with, the number of different genres of content with which the user engages, etc. For example, if the threshold is that users with an affinity score in the top 10% will be included in the subset of associated users and User P has an affinity score in the top 8% of users, then User P will be included in the subset of associated users for User B.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 4:
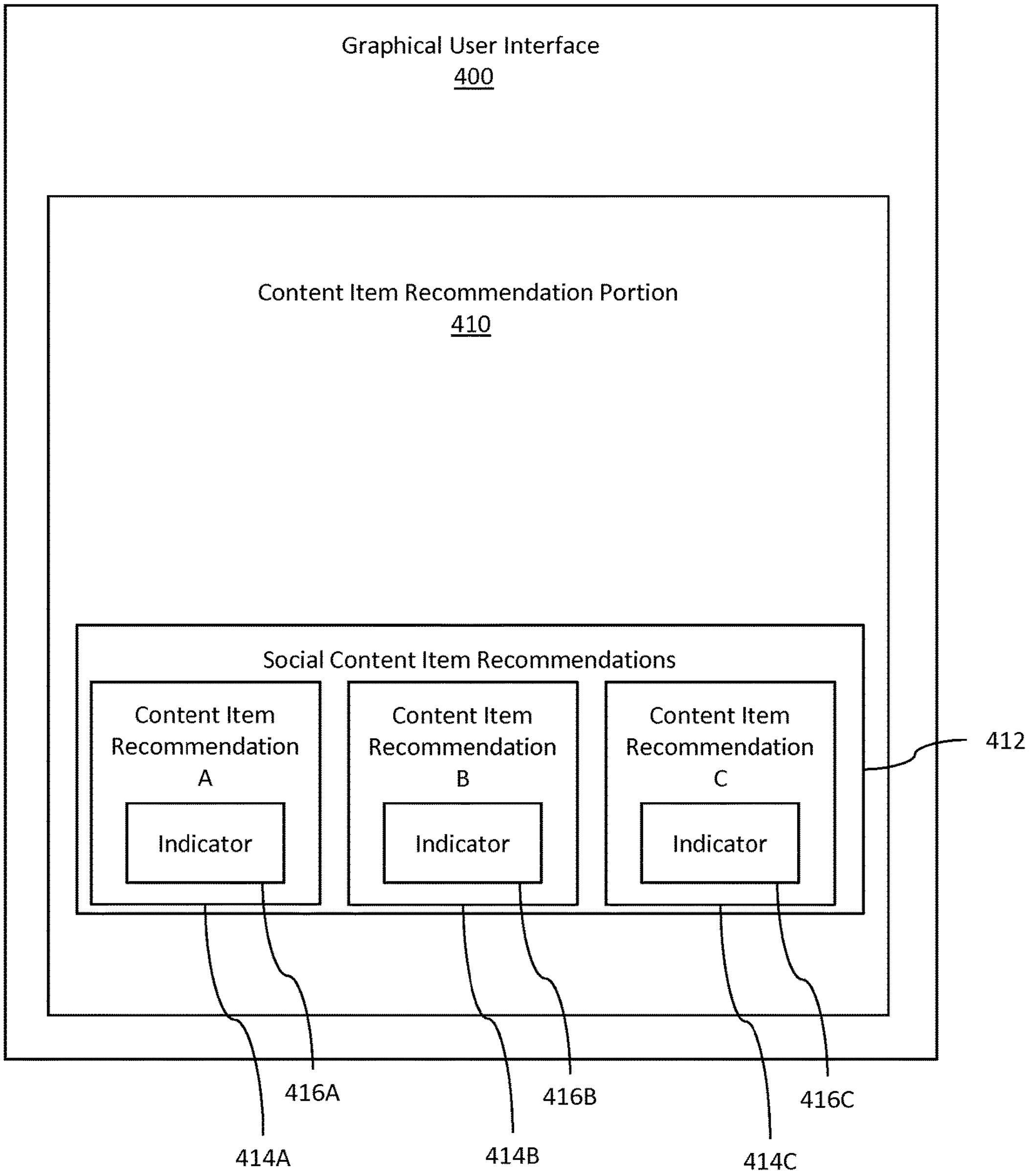
FIG. 4 is a user interface for providing content recommendations, according to implementations of the disclosure.

FIG. 4 is illustrates a graphical user interface 400 for a user according to an embodiment (e.g., on a display of a user device 105A-Z of FIG. 1). The graphical user interface 400 can include a content item recommendation portion 410, (e.g., a window). The content item recommendation portion 410 can display social content item recommendations 412, which can include recommendations for content items determined based on a social graph via methods disclosed herein. For example, social content item recommendations 412 can include content item recommendation A 414A, content item recommendation B 414B, and content item recommendation C 414C. Content item recommendations A-C 414A-414C can be determined for the user based on a subset of associated users or selected users from a subset of associated user, where, e.g., content item recommendation A 414A is a content item interacted with by User A of the subset of associated users, content item recommendation B 414B is a content item interacted with by User B of the subset of associated users, and content item recommendation C 414C is a content item interacted with by User C of the subset of associated users. In a further example, content item recommendation A 414A can include an indicator 416A, content item recommendation B 414B can include an indicator 416B, and content item recommendation 414C can include an indicator 416C, where indicators 416A-C can include an indication of the associated user on which the recommendation is based, a comment/like/rating of the associated user on which the recommendation is based, an indication of subject matter of the recommendation, or any other suitable indicator to associate with the recommendation.

Figure 5:
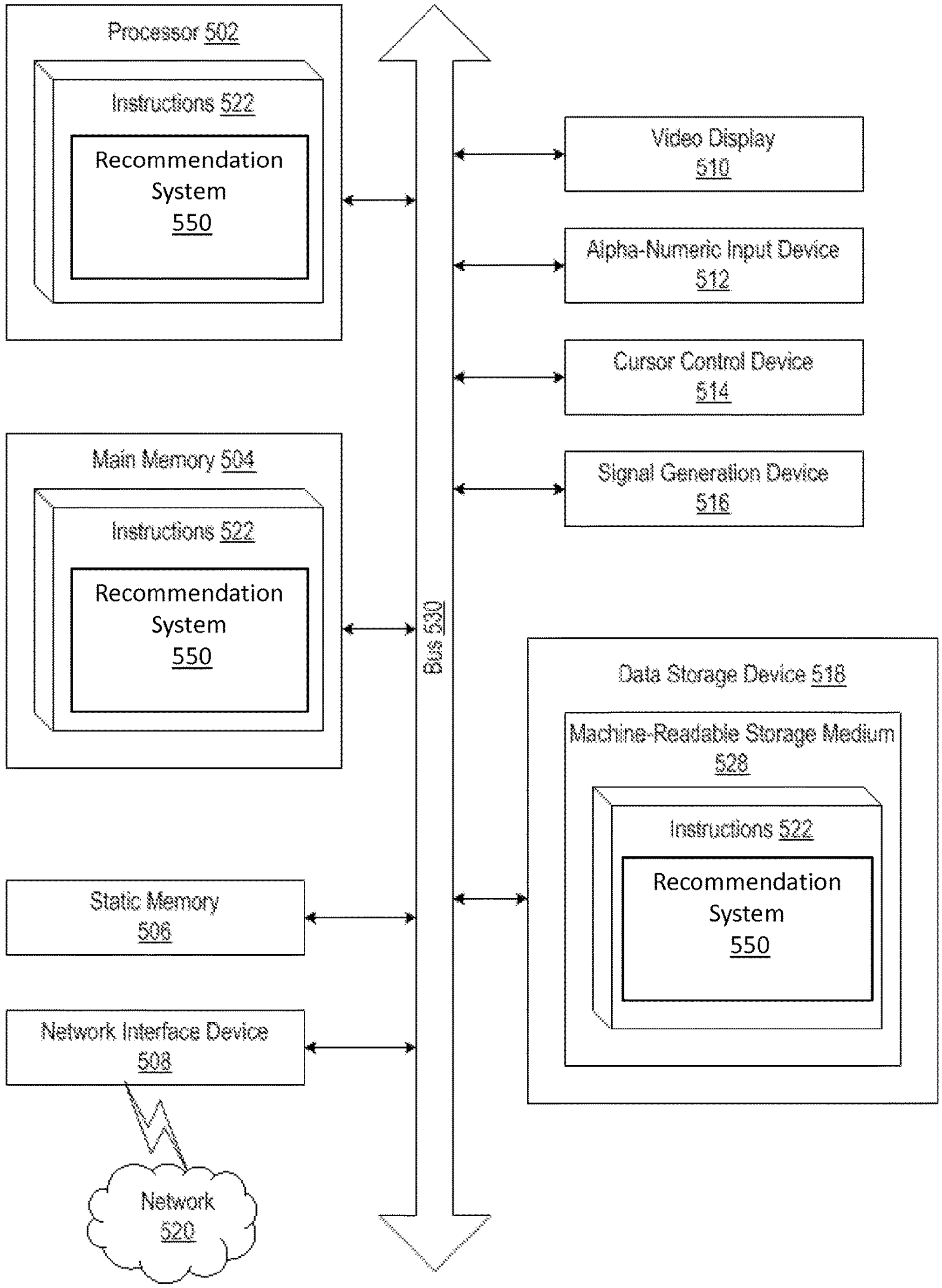
FIG. 5 is a block diagram illustrating an exemplary computer system, according to some implementations.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (or computer-readable storage medium) on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 516 via the network interface device 508.

In one embodiment, the instructions 522 include instructions for recommendation system 550, which may correspond to recommendation system 135 of FIG. 1, and/or a system for providing content recommendations. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

identifying, by a processing device, social relationship data for a user, the social relationship data comprising a set of associated users;

determining, by the processing device, a subset of the set of associated users based on similarity between content item interactions of the associated users and content interactions of the user on a content sharing server;

providing, by the processing device, the subset of associated users as recommended users to follow by the user;

receiving, by the processing device, an indication of a selection of users from the subset of associated users;

originating, by the processing device, a social content item recommendation list for the user based on the selected users; and providing, by the processing device, the social content item recommendation list to the user.

2. The method of claim 1, wherein the subset of associated users is determined based on at least one of current subscriptions of the user or an activity history of the user on the content sharing server.

3. The method of claim 1, wherein determining the subset of associated users comprises:

determining content items on the content sharing server with an interaction by the user;

for each content item viewed by the user, determining other users of the set of associated users that had an interaction with the content item to determine an affinity score for each user; and selecting users for the subset of users with an affinity score that exceeds a threshold.

4. The method of claim 1, wherein the user is also a member of an online social network separate from the content sharing server, and wherein the social relationship data is determined based on connections of the user on the social network to other users of the social network.

5. The method of claim 1, wherein the social relationship data is determined from an address book of the user.

6. The method of claim 1, further comprising generating a subscription to the selected users on the content sharing server.

7. A method comprising:

identifying, by a processing device, social relationship data for a user, the social relationship data comprising a set of associated users;

determining, by the processing device, a subset of the set of associated users based on similarity of content item interaction on a content sharing server;

using, by the processing device, content items associated with the subset of associated users to originate a social content item recommendation list for the user; and providing the social content item recommendation list to the user.

8. The method of claim 7, wherein the subset of associated users is determined based on at least one of current subscriptions of the user or an activity history of the user on the content sharing server.

9. The method of claim 7, wherein determining the subset of associated users comprises:

determining content items on the content sharing server with an interaction by the user;

for each content item viewed by the user, determining other users of the set of associated users that had an interaction with the content item to determine an affinity score for each user; and selecting users for the subset of users with an affinity score that exceeds a threshold.

10. The method of claim 7, wherein the user is also a member of an online social network separate from the content sharing server, and wherein the social relationship data is determined based on connections of the user on the social network to other users of the social network.

11. The method of claim 7, wherein the social relationship data is determined from an address book of the user.

12. A non-transitory machine-readable storage medium storing instructions which, when executed, cause a processing device to perform operations comprising:

identifying social relationship data for a user, the social relationship data comprising a set of associated users;

determining a subset of the set of associated users based on similarity of content item interaction on a content sharing server;

providing the subset of associated users as recommended users to follow by the user;

receiving an indication of a selection of users from the subset of associated users;

originating a social content item recommendation list for the user based on the selected users; and providing the social content item recommendation list to the user.

13. The non-transitory machine-readable storage medium of claim 12, wherein the subset of associated users is determined based on at least one of current subscriptions of the user or an activity history of the user on the content sharing server.

14. The non-transitory machine-readable storage medium of claim 12, wherein determining the subset of associated users comprises:

determining content items on the content sharing server with an interaction by the user;

for each content item viewed by the user, determining other users of the set of associated users that had an interaction with the content item to determine an affinity score for each user; and selecting users for the subset of users with an affinity score that exceeds a threshold.

15. The non-transitory machine-readable storage medium of claim 12, wherein the social relationship data is determined from an address book of the user.

16. The non-transitory machine-readable storage medium of claim 12, wherein the operations further comprise generating a subscription to the selected users on the content sharing server.

17. The non-transitory machine-readable storage medium of claim 12, wherein the user is also a member of an online social network separate from the content sharing server, and wherein the social relationship data is determined based on connections of the user on the social network to other users of the social network.

18. A system comprising:

a memory to store a plurality of content items;

a processing device coupled to the memory, the processing device to:

identify social relationship data for a user, the social relationship data comprising a set of associated users;

determine a subset of the set of associated users based on similarity of content item interaction on a content sharing server;

provide the subset of associated users as recommended users to follow by the user;

receive an indication of a selection of users from the subset of associated users;

originate a social content item recommendation list for the user based on the selected users; and provide the social content item recommendation list to the user.

19. The system of claim 18, wherein the subset of associated users is determined based on at least one of current subscriptions of the user or an activity history of the user on the content sharing server.

20. The system of claim 18, wherein to determine the subset of associated users, the processing device is to:

determine content items on the content sharing server with an interaction by the user;

for each content item viewed by the user, determine other users of the set of associated users that had an interaction with the content item to determine an affinity score for each user; and select users for the subset of users with an affinity score that exceeds a threshold.

21. The system of claim 18, wherein the user is also a member of an online social network separate from the content sharing server, and wherein the social relationship data is determined based on connections of the user on the social network to other users of the social network.

22. The system of claim 18, wherein the social relationship data is determined from an address book of the user.

23. The system of claim 18, wherein the processing device is further to generate a subscription to the selected users on the content sharing server.

24. A system comprising:

a memory to store a plurality of content items;

a processing device coupled to the memory, the processing device to:

identify social relationship data for a user, the social relationship data comprising a set of associated users;

determine a subset of the set of associated users based on similarity of content item interaction on a content sharing server;

use content items associated with the subset of associated users to originate a social content item recommendation list for the user; and provide the social content item recommendation list to the user.

25. The system of claim 24, wherein the subset of associated users is determined based on at least one of current subscriptions of the user or an activity history of the user on the content sharing server.

26. The system of claim 24, wherein, to determine the subset of associated users, the processing device is to:

determine content items on the content sharing server with an interaction by the user;

for each content item viewed by the user, determine other users of the set of associated users that had an interaction with the content item to determine an affinity score for each user; and select users for the subset of users with an affinity score that exceeds a threshold.

27. The system of claim 24, wherein the user is also a member of an online social network separate from the content sharing server, and wherein the social relationship data is determined based on connections of the user on the social network to other users of the social network.

* * * * *